INVENTOR.
MERLE L. KINDER
BY MERLE L. KINDER II
Frank H Foster
ATTORNEY

Nov. 23, 1971  M. L. KINDER ET AL  3,621,620
MACHINING TOOL

Filed March 20, 1969                                  5 Sheets-Sheet 2

*INVENTOR.*
MERLE L. KINDER
BY MERLE L. KINDER II
*Frank H. Foster*
ATTORNEY Nov. 23, 1971    M. L. KINDER ET AL    3,621,620

MACHINING TOOL

Filed March 20, 1969    5 Sheets-Sheet 3

INVENTOR.
MERLE L. KINDER
MERLE L. KINDER II
BY Frank H Foster
ATTORNEY

United States Patent Office 3,621,620
Patented Nov. 23, 1971

3,621,620
MACHINING TOOL
Merle Leslie Kinder and Merle Leslie Kinder II, Columbus, Ohio, assignors to Ohio Machine Tool Products, Inc., Columbus, Ohio
Filed Mar. 20, 1969, Ser. No. 808,833
Int. Cl. B24b 41/06, 53/12
U.S. Cl. 51—216 R                                11 Claims

ABSTRACT OF THE DISCLOSURE

A basic rotatable workpiece and tool holder is disclosed along with several attachments. The basic unit has a support frame to which an arbor is mounted in a bearing. The arbor has a thrust adjustment comprising an annular longitudinally tapered groove surrounded by a collar. The collar is provided with set screws seating against the groove. A hand gripped knob is provided at one end of the arbor for rotating it and a connector having intersecting slots and of planar seating surface is fixed to the opposite end of the arbor. Stop pins are provided on the support frame for limiting the arc of rotation, and threaded bores are provided on the support frame for the attachment of accessories. A wheel dresser arm attachment is connectible to the connector of the basic unit. A V block clamp which is slidable along a radial bar is mountable on the connector. Also shown is an adjustable arc of rotation limiter having slidable stop pins adjustable to a desired arc of rotation. A band grinder is disclosed which is attachable to the basic unit and comprises an arcuate platform which is concentric with the axis of rotation and on which the butt welded ends of a band are clamped and then ground to a uniform thickness. A drilling fixture for guiding a drill bit is disclosed which comprises a laterally adjustable cross beam and a longitudinally slidable sleeve for containing a drill bushing. A grinding method is shown in which a grinding wheel is first dressed to an arcuate surface and then a workpiece is grindingly rotated against this surface.

BACKGROUND OF THE INVENTION

This invention relates to machine shop tools, and more particularly relates to a small rotatable workpiece or tool holder which is provided with several attachments. The invention further relates to a method of grinding with rotatable holders.

Rotatable holders are most often used either to make an arcuate grind on a workpiece by rotating the workpiece against a grinding wheel or are used to dress a grinding wheel by rotating a diamond dressing point against the wheel. Inherent in previous rotatable holders have been two general classes of problems.

Previous holders have been capable of performing only a single function. They set on a shelf until their particular function is needed, they are withdrawn to perform a function, and then they are returned until their single function is again needed. There is, therefore, a need for a rotatable holder which can be easily but accurately adapted to perform a diverse variety of functions.

Previous holders have also either been so large that their maneuverability was restricted, or they possessed substantial inaccuracies. Rotatable holders normally include a bearing with an arbor journalled in it. The workpiece or tool is, through various structures, attached to this arbor. During rotation of the workpiece or tool against the grinding wheel, significant movement of the arbor either longitudinally or radially will produce significant inaccuracy. Such movement, which might be longitudinal or radial vibration, has been prevented in previous holders by using a relatively long bearing and arbor, thus making the rotatable work holder relatively long. In one aspect of our invention, an adjustment is provided for the arbor which permits use of a relatively short arbor and bearing while eliminating vibration and the substantial inaccuracy therefrom.

It is therefore an object of the invention to provide an improved rotatable holder.

Another object of the invention is to provide a basic rotatable unit which has an arbor adjustment which permits use of a relatively short arbor and prevents vibration of the arbor.

Another object is to provide a connector on the arbor of a basic rotatable unit to which diverse attachments can be easily but accurately connected.

Another object is to provide a basic rotatable unit which has a support frame which facilitates and accommodates attachment of a variety of accessories and thereby provides a tool having a great number of functions and purposes.

Another object is to provide a basic unit with convenient and easily operated stop pins for limiting the arc of rotation of the basic rotatable unit.

Another object is to provide a V block clamp which can be easily but accurately attached to the connector of the basic rotatable unit and which is not only adjustable along a radius of the arbor but also is finely adjustable circumferentially of the axle and angularly around its own axis to an extreme accuracy.

Another object is to provide an attachment for the basic rotatable unit which provides adjustable stops for selectively limiting the arc of rotation of the basic unit.

Another object is to provide a device which can be, in one embodiment, attached to the basic rotatable unit and used to grind a welding bead from a pair of butt welded bands so that a band of uniform thickness results.

Another object is to provide a drilling fixture which, in one embodiment, may be attached to the basic rotatable unit and which can be adjustably positioned to position a drill bushing for drilling a workpiece.

Yet another object of our invention is to provide a grinding method wherein two radii are simultaneously ground in a workpiece resulting in step and time savings and no mismatch between the functional portion of the punch and the fillet radius.

Further objects and features of the invention will be apparent from the following specification and claims when considered in connection with the accompanying drawings illustrating several embodiments of the invention.

SUMMARY OF THE INVENTION

We have found that the foregoing and other objects may be attained in a machining tool comprising (a) a support frame; (b) a bearing attached to the frame; (c) an arbor journalled in the bearing; (d) means fixed to the arbor for applying a rotational force to the arbor; and (e) a connector fixed at its proximal end to a first end of the arbor for connecting an attachment to the arbor for rotation therewith.

The objects are better attained if the arbor of the machining tool is provided with an angular surface and has a collar surrounding at least a portion of the arbor at the angular surface, the collar having a fitted hole in it and a set screw positioned in the hole for adjustably seating against the angular surface so that tightening of the screw against the angular surface causes longitudinal movement of the collar along the arbor to clamp the arbor in the bearing.

Further improved operation is made possible if the connector is a body having intersecting slots therein. An attachment is connected to the connector, which attachment has a boss for snugly seating within one of the slots and a cylindrical rod protruding from the boss snugly fitting within the other side of the slots.

Further improved operation is made possible by use of an attachment with the above described machining tool, the attachment comprising: (a) a bar radially attached to the connector; (b) a saddle clamp fixed to the V block clamp, the saddle clamp provided with a pair of stirrup members having the bar slidably engaged between the stirrup members; and (c) adjustable clamping means adjustable into engagement with the bar so that the V block can be radially adjusted along the bar and clamped in a desired position with the clamping means.

In order to further attain the above objects, an adjustable arc limiting accessory may be used with the above described unit, the arc limiting accessory comprising: (1) a base member rigidly mountable to the frame; (2) a guide member fixed to the base member and extending along a path followed by a radius of the axis of rotation of the arbor; and (3) a stock pin slidably attached to the guide member limiting the arc of rotation of the arbor.

A further attachment is provided for grinding an enlarged portion of a band, the attachment comprising: (a) a support frame; (b) a bearing attached to the frame; (c) an arbor journalled in the bearing; (d) means fixed to the arbor for applying a rotational force to the arbor; and (e) a holding member connected to the arbor for rotation therewith, the holding member having an external arcuate surface for engaging one side of the band. A band is positioned on this attachment with one side seated against the arcuate surface and will be rotated therewith while an enlargement protruding from the other side is maintained in grinding contact with a grinding wheel.

A drilling fixture attachment is provided which may be used for adjustably and rigidly positioning a drill bushing in juxtaposition to a workpiece, the drilling fixture comprising: (a) a support frame; (b) means for positioning the workpiece near the support frame; (c) a cross beam adjustably fixed to the support frame and provided with a slot therein; (d) a sleeve slidably positioned in the slot and having an axial bore therethrough; and (e) means for rigidly clamping the sleeve in the slot. A workpiece for drilling may be positioned near the support frame and a cross beam in the sleeve may be adjusted to position a drill at a desired juxtaposition to the workpiece.

Finally, a method for attaining the above objects comprises dressing a selected non-cylindrical surface into a grinding wheel and rotating a workpiece while in grinding contact with the selected surface of the wheel.

DESCRIPTION OF THE VIEWS

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

Basic rotatable unit

Figure 1:
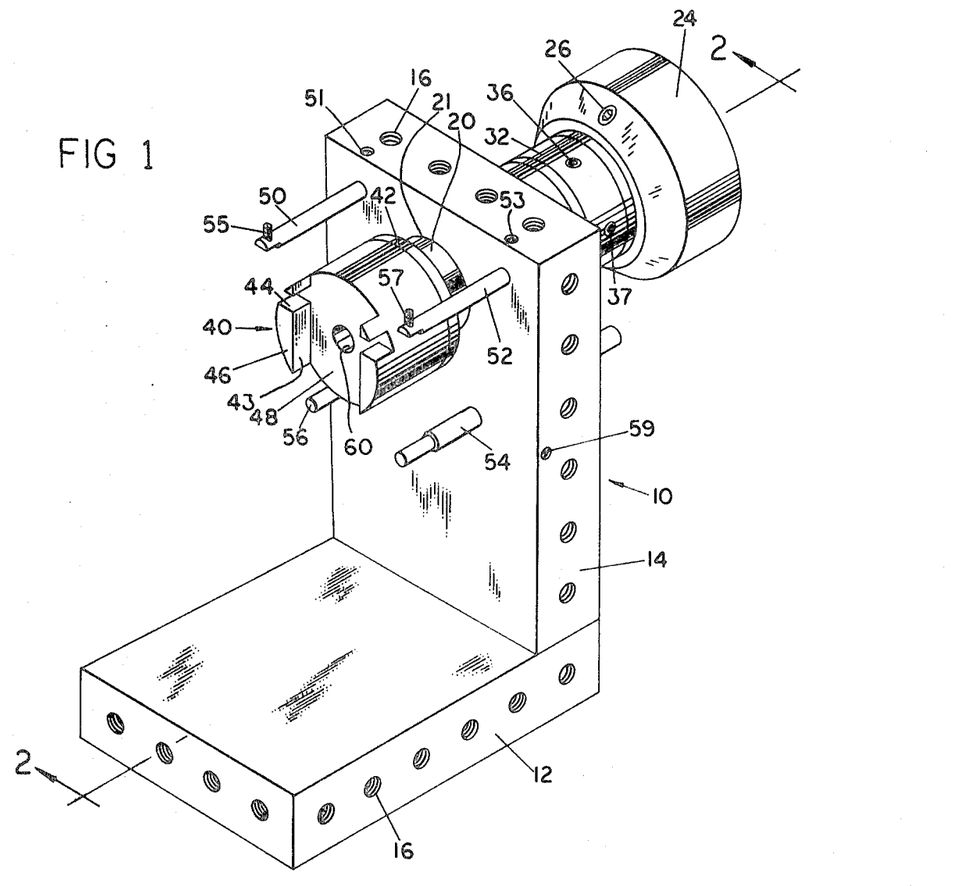
FIG. 1 is a view in perspective of a basic rotating unit constructed according to the invention.
Figure 2:
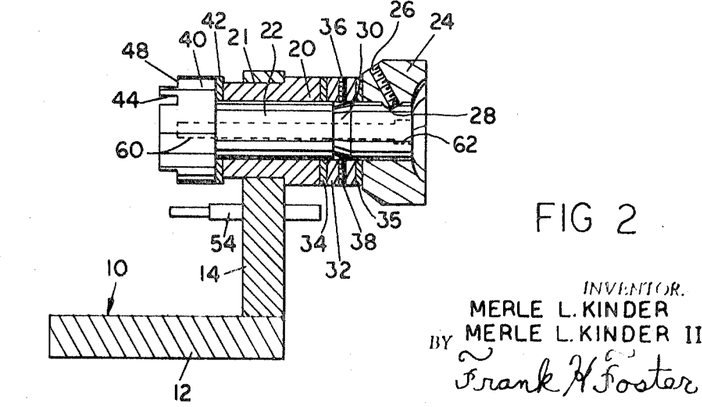
FIG. 2 is a view in vertical section of the basic rotating unit taken substantially along the line 2—2 of FIG. 1.

The basic rotatable unit is illustrated in FIG. 1 and FIG. 2. Its purpose is to support and permit rotation of either a tool or a workpiece. This basic unit has a support frame 10 which includes a base plate 12 and a vertical plate 14 which is doweled and bolted perpendicularly to the base plate 12. Both the vertical plate 14 and the base plate 12 have a plurality of threaded bores 16 tapped along their edges. These are provided to accommodate a variety of accessories such as illustrated in this application or which may be later designed. Preferably, the opposite edges of the base plate and the vertical plate are parallel and are squared so that they will accurately position such accessories and will function as guides for them.

A bearing 20 is permanently press fitted in a bore 21 in the support frame 10. Although tapered roller bearings could be used, they are not preferred for the intended applications. In the bearing 20, an arbor 22 is journalled. A knob 24 is fixed to one end of the arbor 22 by a knob setscrew 26 threadedly engaged in the knob 24 and seated in a small niche 28 near the end of the arbor 22. The knob 24 is a means for applying a rotational force to the arbor by a twist of an operator's wrist.

The arbor 22 has an angular surface in the form of an annular, longitudinally tapered groove 30 spaced from one end of the bearing 20. Surrounding the annular groove 30 is a collar 32 positioned between two smooth, square, soft metallic thrust washers 34 and 35. Radially adjustable set screws 36, 37, 38, and a fourth not shown, are spaced around the periphery of the collar and are threadedly engaged to it.

These set screws are preferably provided with spherical hard coated tips which seat against the tapered groove 30. When the set screws in the collar 32 are tightened against the tapered groove 30, the collar is wedged toward the bearing 20. A member, such as a connector 40 fixed to the opposite end of the arbor, is also drawn toward the bearing from which it is separated by a washer 42. Thus the bearing 20 is adjustably clamped between the thrust washers 34 and 42 and intermediate the connector 40 and the collar 32. This thrust adjustment permits tightening of the arbor in a relatively short bearing and prevents vibration of the arbor and end play. Wear of the washers 34 and 42 at each end of the bearing is easily compensated for by tightening of the set screws in the collar 32.

A connector 40 is fixed to the opposite end of the arbor for connection to any of a variety of attachments. We prefer that the connector 40 and the arbor 22 be manufactured from a single piece of material. A conventional chuck or a vise clamp could of course be used but would result in an appreciable loss of accuracy. The connector 40 constructed according to the invention is preferred because of its combination of accuracy and ease of use.

This connector 40 has a pair of perpendicularly intersecting slots 43 and 44 at its distal end 46. They are each oriented substantially parallel to a plane which is perpendicular to the axis of the arbor 22. The larger slot 43 has a planar bottom seating surface 48 which is perpendicular to the axis of the arbor 22. This planar surface 48 functions as a guide for the accurate positioning of various attachments. The larger slot 43 is also preferably radially aligned to the arbor. The function, purposes, and advantages of this connector are described below.

The preferred embodiment of the basic rotating unit illustrated in FIG. 1 is provided with four longitudinally slidable stop pins. The upper pair of slidable stop pins 50 and 52 can be rigidly positioned by their set screws 51 and 53 which are threadedly engaged in the vertical plate 14 and can be tightened against the slidable stop pins 50 and 52. A flat surfaced niche (not shown) can be ground on the exterior of the slidable stop pins to facilitate their accurate positioning.

The tips of the upper stop pins 50 and 52 have been ground half round and are provided with a pair of adjusting set screws 55 and 57. These upper stop pins 50 and 52 restrict the arc of rotation of various work pieces, tools or the radial bar 100 (illustrated in FIG. 4) to a maximum rotation of 180°. Their adjusting set screws 55 and 57 provide accurate adjustment of this arc to exactly 180°.

The lower pair of longitudinally slidable stop pins 54 and 56 may be slid forward to limit the arc of rotation of various work pieces, tools or the bar illustrated in FIG. 4 to a maximum rotation of 90 degrees (as explained below). The spacing and positioning of the stop pins is, of course, optional but the most commonly used arcs of rotation are preferred. The lower stop pin 54 can be held rigid by a set screw 59 which can be tightened against it as described above. Similarly the other lower stop pin 56 has a set screw for holding it rigid.

Finally, a bore 60 and a counterbore 62 have been drilled longitudinally through the center of the arbor 22. These bores permit a sufficiently long Allen cap screw to be inserted in the knob 24 end of the arbor 22 and threadedly engaged to an attachment may be drawn against the planar bottom seating surface 48 of the connector 40.

Wheel dresser arm

Figure 3:
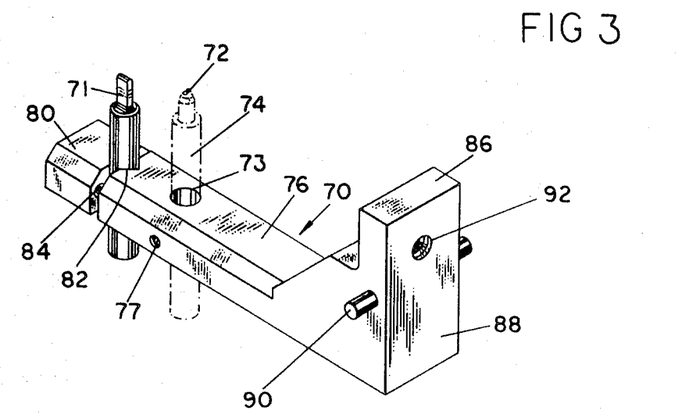
FIG. 3 is a view in perspective of a dresser arm constructed according to the invention which is attachable to the connector of the basic unit illustrated in FIG. 1, and further illustrates the structure which accurately mates with that connector.

A wheel dresser arm is illustrated in FIG. 3 and is adapted to be accurately attached to the connector of the basic rotatable unit illustrated in FIG. 1.

The arm 70 has a shank 76 with a longitudinally adjustable portion 80. A pair of opposing V slots, such as V slot 82, are cut in the shank 76 and seat against opposite sides of a workpiece 71. The V slots are clamped against the workpiece 71 by tightening two longitudinal cap screws, such as cap screw 84, which are threaded into the shank 76. The workpiece 71, for example a punch, is inserted between the movable portion 80 of the shank 76 and the stationary portion and positioned at the desired radius. This radius may be for grinding a concave or a convex surface. The cap screw 84 and the opposite similar cap screw are tightened to clamp the punch rigidly in the shank 76. The V slots are ground to align a square or cylindrical shanked workpiece along a radius of the axis of rotation.

A bore 73 is also provided in the shank 76 into which a support rod 74 is inserted which supports a diamond cutting point 72. These are illustrated in phantom. Normally, the diamond point 72 and the workpiece 71 will not be simultaneously mounted on the shank 76. The diamond point 72 is, of course, used to dress a grinding wheel. It is longitudinally slidable in the bore 73 and will be adjusted, as with the workpiece 71, to a desired radius. The diamond point 72 is then locked into position by tightening a set screw 77, which is threaded into the shank 76, against the support rod 74.

In order to have the diamond tip 72 or the workpiece 71 lying on a radius of the axis of rotation, it is obvious that the dresser arm 70 must always be accurately connected to the basic rotating unit. The manner in which this is accomplished illustrates an advantage of our invention and the features of the connector 40 illustrated in FIG. 1.

The dresser arm 70 has a boss 86 at one end. The boss 86 has a planar end surface 88 which seats against the planar bottom seating surface 48 of the connector 40. A cylindrical rod 90 protrudes perpendicularly from the boss 86. This rod 90 will side snugly into the smaller slot 44 in the connector 40.

The dresser arm 70 is attached to the connector 40 by first inserting the boss 86 partially into the large slot 43. It fits so snugly that it is necessary to rock the arm 70 to work the planar end surface 88 against the seating surface 48 of the connector 40. Because the protruding rod 90 is cylindrical, this rocking can be done while the rod 90 slides into the smaller slot 44.

The mating of the end surface 88 against the seating surface 48 assures that the dressing arm 70 is squared with the basic rotatable unit. The protruding rod 90 assures the proper radial positioning of the dresser arm 70. An Allen cap screw may be inserted into the counterbore 62 of the basic unit, through the bore 60, and into a threaded hole 92 in the boss 86 in order to clamp the end surface 88 against the seating surface 48.

There are several advantages with the connector 40 and its cooperating boss and rod. First, it has an accuracy advantage. The two pieces are not connected by moving parts so that positioning tolerances can be as close as they can be machined. The diamond point 72 can be pre-set to the proper position. The dresser arm can then be removed from the basic unit and later remounted to it without requiring any readjustment. Unlike a conventional chuck, the dresser arm and cutting point 72 of our invention will always be identically remounted along the same radius of rotation. The boss 86 fitting in the large slot 43 of the connector 40 and seating against its seating surface 48 together with the cylindrical rod 90 fitting into the smaller slot 44 assure the identical repositioning of the cutting point 72 without adjustment. Even if the basic unit or the dresser arm themselves contained error, once the cutting point is accurately positioned and this error is compensated for, it can be removed and returned with no introduction of error. If the shank 76 were slightly bent into misalignment, for example by being dropped, it can easily be realigned by regrinding the planar end surface 88. Finally, such accurate attachment of an accessory to the basic rotatable unit could hardly be easier than described above.

V block clamp

Figure 4:
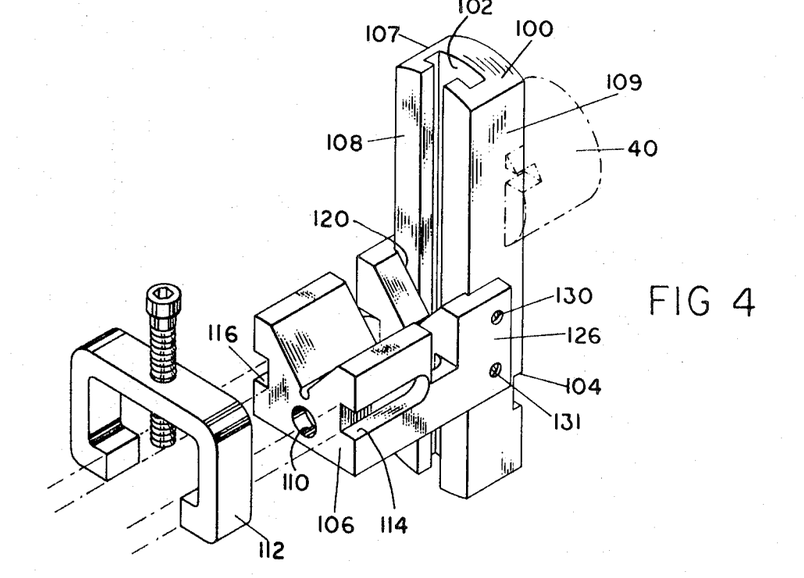
FIG. 4 is a view in perspective of a V block clamp which is attachable to the connector of the basic unit illustrated in FIG. 1 and is constructed according to the invention.
Figure 5:
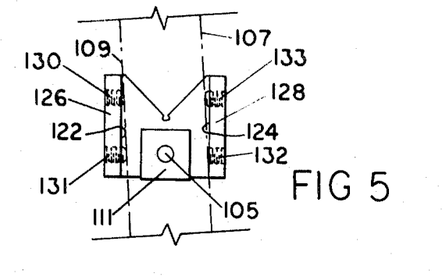
FIG. 5 is a view in side elevation of the V block illustrated in FIG. 4 and illustrates its adjustable saddle clamp mounting.

In FIG. 4 and FIG. 5 a V block clamp is illustrated which can be attached to the connector 40 (illustrated in phantom) of the basic rotatable unit.

A radial bar 100 with a rectangular cross section is snugly fit into and mates with the large slot 42 of the connector 40. The bar 100 has one or more and preferably three rear threaded holes so that a bolt in the arbor bore 60 may be used to seat the bar 100 tightly against the seating surface 48 of the connector 40. In this manner, the bar is accurately positioned in any one of several positions on the basic rotating unit. A longitudinal T groove 102 is cut into the front face 108 of the bar 100 and a lateral groove 104 has also been cut into its opposite side.

A V block 106 is clamped against the front face 108 of the radial bar 100 by a screw 105 inserted in a counterbore 110 and in a co-axial bore. The screw 105 is threadedly engaged to a small plate or nut member 111 which slides along in the broad portion of the T groove 102. A U-shaped clamping member 112 is also provided and is useful to clamp either a workpiece or a tool against the V slot of the V block. The clamping member 112 has a pair of fingers which slide into a pair of channels 114 and 116 on opposite sides of the V block 106.

One important feature of the V block clamp attachment is the manner in which the V block 106 clamps to the radial bar 100.

Referring to FIGS. 4 and 5, the V block has a channel 120 in one end which receives the radial bar 100. The channel 120, walls 122 and 124, are formed by a pair of stirrup members 126 and 128 which are preferably an extension of the V block 106. Adjustable clamping means in the form of inwardly directed set screws 130, 131, 132 and 133 are threadedly engaged in opposite ends of each of the stirrup members 125 and 128. The channel 120, the stirrup members 126 and 128 and the set screws 130, 131, 132 and 133 together form a saddle clamp which positions, and with the screw 105 clamps the V block to the radial bar 100.

As shown in somewhat exaggerated degree in FIG. 5, the channel 120 must have a width slightly greater than that of the radial bar 100 to permit sliding of the V block 106 along the bar 100. By selectively tightening the set screws 130 through 133 against the radial bar 100, the V block may be finely adjusted circumferentially of the arbor 22 (in FIG. 1) (laterally of the radial bar 100) and also may be finely adjusted angularly around its own axis. Further tightening of these set screws rigidly clamps the saddle clamp, and therefore the V block 106 to the radial bar 100. In FIG. 5, the saddle clamp is shown in exaggerated angular adjustment around its own axis.

The purposes of providing an adjustable saddle clamp attachment to a radial bar include: first, to permit an adjustment which can compensate for wear of the radial bar 100 or the channel walls 122 and 124, or various other misalignments or wear which might occur; and second, to permit adjustment to compensate for any misalignment or wear of the workpiece or tool clamped to the V block.

To assemble and operate the V block clamp on the basic rotating unit, the radial bar 100 is first snugly inserted in the connector 40 with one of its several threaded holes aligned with the connector bore 60. A cap screw is inserted through the arbor bore 60 and threaded into the radial bar 100 to tighten the radial bar against the seating surface 48 of the connector 40. This assures radial alignment of the radial bar 100. The V block 106 is then positioned at one end of the radial bar 100 and the nut member 111, already threaded to a screw in the counterbore 110, is slid into the T groove 102. Now, a workpiece or tool can be clamped in the V block 106 and the V block 106 can be slid to its desired radial position. By alternative tightening of the set screws 130–133 and of the nut member 111, by tightening the screw 105 the V block can be accurately aligned and positioned.

The workpiece can be rotated against a grinding wheel by rotation manually of the knob 24 and arcuately ground with an internal or external surface of substantially any radius. If a 90° or a 180° rotation is desired for a grinding operation the stop pins illustrated in FIG. 1 can be used. The two upper stop pins 50 and 52 are positioned above the axis of rotation of the arbor 22 a distance equal to one half of the width of the radial bar 100. Thus, the radial bar 100 will be in a perfectly horizontal position when either of its sides 107 or 109 is rotated into contact with either of the stop pins 50 or 52. A groove 104 is provided to permit one end of the radial bar 100 to pass the stop pins 50 and 52 if the bar 100 is centrally mounted on the connector 40. If the bar is offset radially, as illustrated in FIG. 4, only the furthest extending end of the bar 100 will contact the stop pins during rotation. In this manner, the upper stop pins 50 and 52 limit the arc of rotation of the V block to 180°. Similarly, if one of the lower stop pins 54 or 56 is slid longitudinally forward, it will limit the arc of rotation to exactly 90°.

Adjustable arc-limiter

If rotational arc limiting is desired other than the 90° or 180° described above, then the accessory illustrated in FIGS. 6–11 may be employed.

Figure 6:
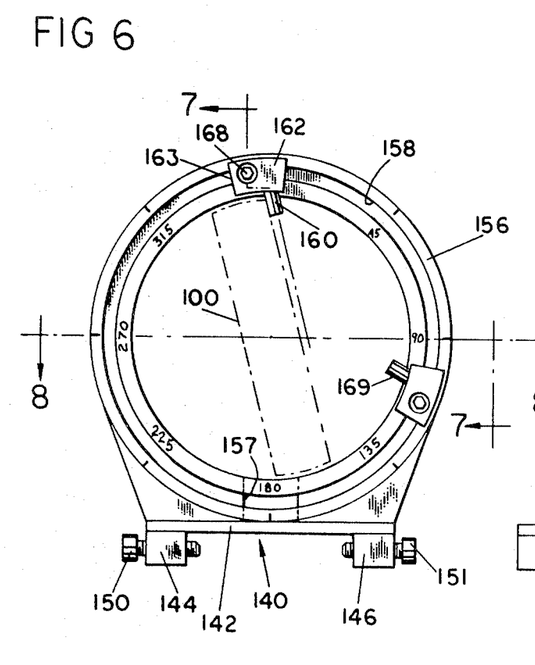
FIG. 6 is a view in front elevation of an adjustable arc limiting accessory constructed according to the invention which can be attached to the basic unit illustrated in FIG. 1.
Figure 7:
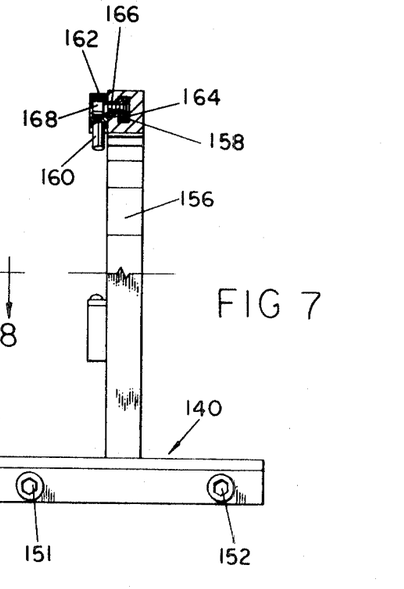
FIG. 7 is a view of the accessory illustrated in FIG. 6, in side elevation and in vertical section taken substantially along the line 7—7 of FIG. 6.
Figure 8:
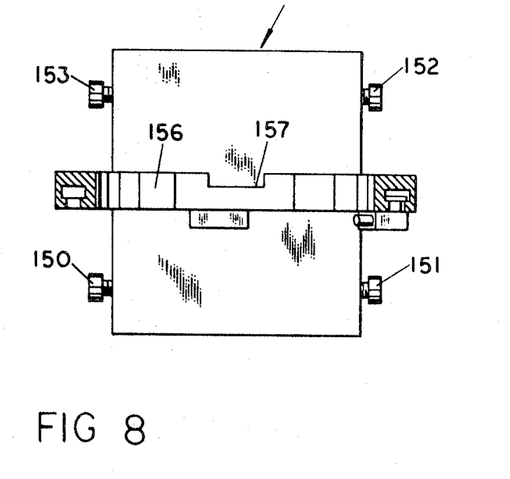
FIG. 8 is a view in horizontal section of the accessory illustrated in FIG. 6 and taken substantially along the line 8—8 of FIG. 6.

The preferred embodiment illustrated has a saddle base member 140 which includes a plate 142, a pair of stirrup members 144 and 146 and inwardly extending screws 150, 151, 152 and 153. The screws 150–153 extend through smooth bores in the stirrup members 144 and 146 and threadedly engage threaded bores along the edge of the horizontal plate 12 of the basic unit. The base member 140 is designed to fit over, slide along the horizontal plate 12 and be clamped to it by the screws 150–153.

A circular guide member 156 is rigidly supported on the base member 140 in a vertical position. The guide member extends along a path which would be followed by a radius of the axis of rotation during rotation of the arbor 22. The preferred guide 156 member is circular and is provided with a circular T groove 158. Stop pins such as a stop pin 160 are mounted to a carriage means so that they can be slid around the guide member 156 and clamped in the desired position. Usual operation requires two stop pins and associated carriage means, one being used for each end of the desired arc of rotation.

Figure 9:
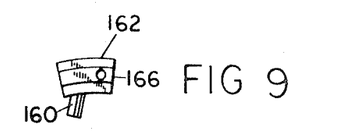
FIG. 9 is a view in side elevation of the adjustable stop pin carriage plate used in the accessory illustrated in FIG. 6.
Figure 10:
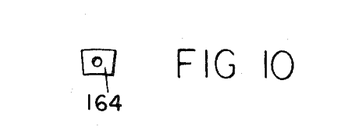
FIG. 10 is a view in side elevation of the carriage nut used in the accessory illustrated in FIG. 6.
Figure 11:
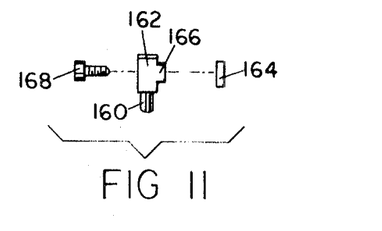
FIG. 11 is an exploded view of the stop pin carriage assembly used in the accessory illustrated in FIG. 6.

The preferred stop pin carriage comprises a carriage plate 162 and a carriage nut 164, the latter being slidable within the wide portion of the T groove 158. The carriage plate 162 has a tongue 166 which slides along the narrow portion of the T groove 158. A cap screw 168 is inserted through a hole in the carriage plate 162 and threadedly engaged to the nut 164. This screw 168 can be tightened to clamp the carriage plate 162 and its stop pin 160 rigidly at a selected position on the guide member 155. A cut out 157 is provided in the rear of the guide member 156 so that the nut 164 can be initially inserted in the wide portion of the T groove 158.

The stop pin 160 and its carriage plate 162 are made to accommodate the radial bar 100. One radial edge 163 of the carriage plate 162 is constructed to be positioned on the graduated guide member 156 at the desired angular stopping position. The stop pin 160 is offset from this radial edge 163 a distance equal to one half the width of the radial bar 100. In this manner, the central, diametrical axis of the radial bar 100 is stopped exactly at the edge 163 of the carriage plate 162. The ends of the radial bar 100 are arcuate, lying along a circle which is concentric to the guide member 156.

A second stop pin assembly 169 is a mirror image of the other assembly and similarly stops rotation of the radial bar 100. It is a mirror image to permit close positioning of the two stop pins if desired.

In the operation of the arc limiting device, the base member 140 is positioned and clamped to the base plate 12 of the basic rotatable unit so that the radial bar, illustrated in FIG. 4, or possibly a workpiece or tool will suitably contact the stop pin 160 during rotation.

The two stop pins, with their carriages, are positioned and clamped at the extreme boundaries of the arc to which rotation is to be limited. With the aid of the arc limiting structure a great number of workpieces can be precisely rotated and ground through an exact arc after the initial, single setting of the stop pins.

It should be noted that the guide member may be non-circular. It is only provided to permit the stop pin 160 to be slid to various radial positions. It is unnecessary, although it is desirable, that the radial distance of the pin from the axis of rotation be identical for every angular position of the pin.

Band grinder

Figures 12, 13:
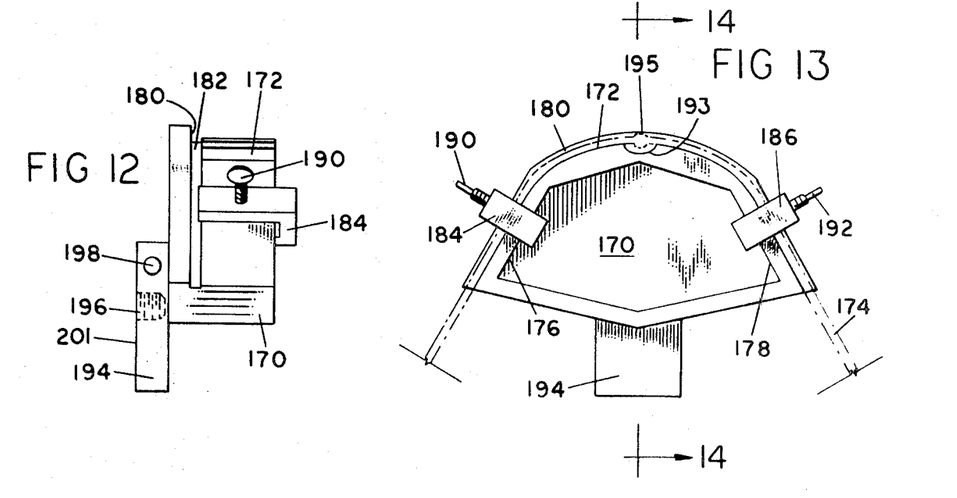
FIG. 12 is a view in side elevation of a band grinder constructed according to the invention and attached to the basic rotating unit illustrated in FIG. 1.
FIG. 13 is a view in front elevation of the band grinder illustrated in FIG. 12.
Figure 14:
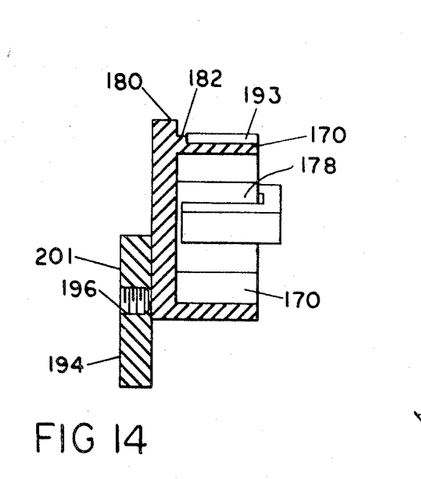
FIG. 14 is a view in vertical section of the band grinder illustrated in FIG. 12 taken substantially along the line 14—14 of FIG. 13.

A band grinding attachment is illustrated in FIGS. 12, 13 and 14. Although we prefer an embodiment which attaches to the basic rotatable unit illustrated in FIG. 1, it should be understood that the band grinder could be adapted for attachment to any arbor which is journalled in a bearing and which further is provided with a means for applying a rotational force to the arbor. Alternatively the band grinder could be provided with a bearing and be journalled on a pin.

The purpose of the band grinder is to facilitate the grinding of a weld bead from a butt weld of the ends of two bands welded into one. It is important that such a welded joint have the same thickness as the remainder of the band. If a saw band, for example, is being considered, it would bind in a saw cut if the welded joint is too thick. It would break at the weld joint if it were too thin. The band grinder of our invention permits accurate grinding of the weld bead to the proper thickness with ease.

Basically, the band grinder is a holding member which is connected to a rotatable arbor and which has an external arcuate surface against which a band is held. The preferred holding member includes a holding member 170 (shaped roughly like a sector of a circle) which has an exterior arcuate surface 172 forming an arcuate platform on which a band 174 (in phantom) can be seated. The sector member 170 is hollowed out to form interior walls 176 and 178. An arcuate flange 180 is formed along the rear edge of the arcuate platform 172 so that the edge of the band 174 may be seated against the flange 180 and thereby squared on the arcuate surface 172. A gutter 182 is provided next to the flange to accommodate the teeth of a saw blade so that the blade can lie flat against the external arcuate surface 172.

A pair of C clamps 184 and 186 are used to clamp the band 174 against the arcuate platform 172. One leg of each clamp extends into the hollow of the holding member 170 and is clamped against the interior walls 176 and 178 respectively. The other leg of each clamp extends over the band 174 and has set screws 190 and 192 which are tightened against the band 174.

The arcuate platform 172 has a transverse slot 193 into which fits the enlarged weld bead portion 195 of the band.

Attached to the back of the band grinder is a plate 194 with a threaded bore 196. This plate 194 has a pair of perpendicularly extending rods, such as rod 198, similar to rod 90, so that it snugly fits into the connector 40 of the basic rotatable unit in the manner described above. A screw positioned in the central arbor bore 60 can be engaged in the threads 196 and tightened to clamp the plate 194 into the connector 40. The rear surface 201 of the plate 194 is planar and is seated against the seating surface 48 of the connector in order to properly align the band grinder.

The simplicity of its operation combined with its accuracy are the chief advantages of our band grinder. The band grinder which we illustrate is first mounted on the basic rotatable unit as described above. A band 174 is then clamped against the arcuate platform 172 by the C clamps 184 and 186. The enlarged portion of the band 174 formed by the weld bead 195 fits into the slot 193 so that the band 174 is arcuate in the area of the weld bead 195. This assembly may then be positioned beneath a grinding wheel. The grinding wheel is then lowered in small increments while the band grinder is reciprocally rotated. The grinding wheel grinds off the enlargement to produce a smooth continuous arcuate surface along the arcuately clamped band. The band is then turned over and the above steps are repeated. The result is a band having a thickness at its butt weld exactly the same as elsewhere.

Drilling fixture

In FIGS. 17–20, a drilling fixture is shown which is constructed according to our invention. The illustrated embodiment is designed to be easily mounted to the basic rotatable unit illustrated in FIG. 1. The purpose of the drilling fixture is to retain a drill bit in proper alignment and position while drilling a bore in a workpiece which is mounted on the basic rotatable unit.

Figure 17:
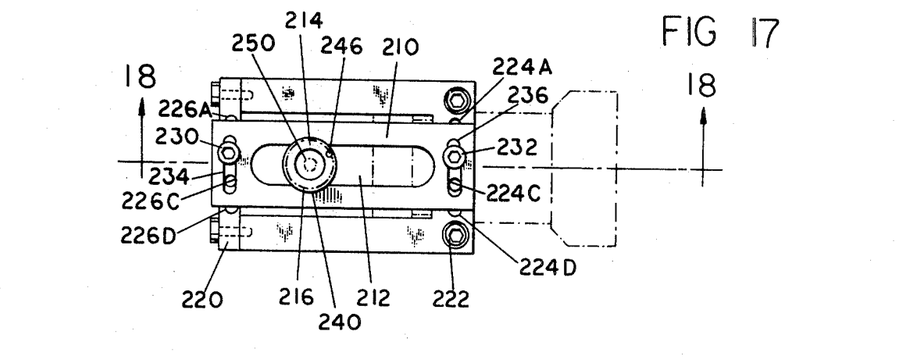
FIG. 17 is a top view of a drilling fixture constructed according to the invention with a basic rotating unit, as illustrated in FIG. 1, shown in phantom.

In more detail, the preferred drilling fixture has suitable support structure comprising the support frame 10 of the basic rotatable unit, a vertical U-shaped support member 220, and a horizontal U-shaped support member 222 all of which are suitably bolted together. These support members support a laterally adjustable cross beam 210. A plurality of threaded holes 224a, 224c, 224d, etc. along the top of the horizontal support member 222 and a similar plurality of threaded holes 226a, 226c, 226d, etc. along the top edge of the vertical support member 220 cooperate with lateral slots 234 and 236 in the cross beam 210 so that the cross beam can be laterally adjusted and rigidly clamped in a selected position. The cross beam 210 is clamped to the support structure by tightening a pair of Allen head cap screws 230 and 232 which preferably are provided with washers beneath their heads and which extend through lateral slots 234 and 236 in the cross beam 210. By selecting the proper threaded hole and sliding the cross beam 210 within the limits of the slots 234 and 236, the cross beam can be clamped to any desired position.

Figure 18:
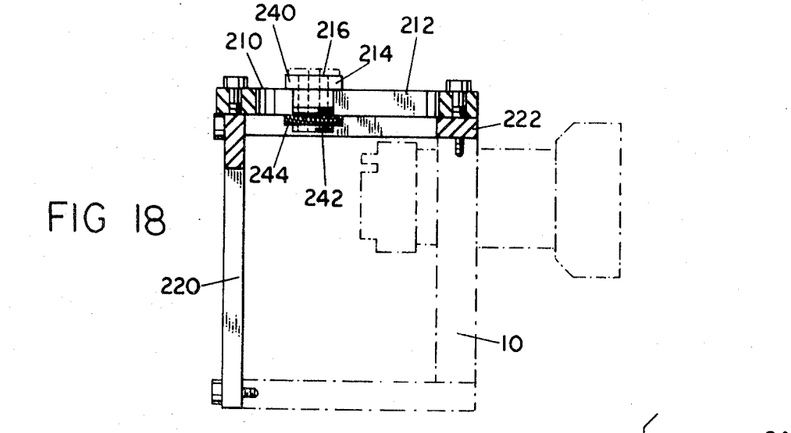
FIG. 18 is a view in vertical section of the drilling fixture illustrated in FIG. 17 taken substantially along the line 18—18 of FIG. 16.
Figure 19:
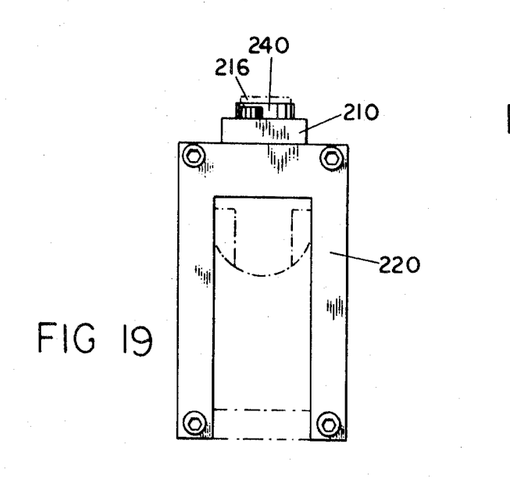
FIG. 19 is an end view in side elevation of the drilling fixture illustrated in FIG. 18.
Figure 20:
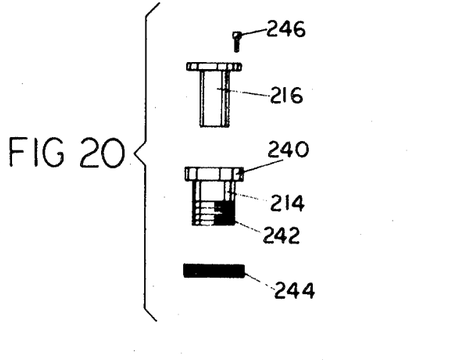
FIG. 20 is an exploded view of the sleeve, bushing, and nut members used in the drilling fixture illustrated in FIG. 17.

FIG. 20 shows the details of a sleeve assembly which slides along a longitudinal slot 212 in the cross beam 210. The sleeve 214 has a flanged head 240 at one end and threads 241 at its opposite end. A threaded, knurled nut 244 can be screwed onto the sleeve 214 for rigidly positioning the sleeve 214 at a desired position along the slot 212. When assembled in the slot 212 as illustrated in FIG. 18 the cross beam is clamped between the flanged head 240 and the nut 244. A conventional drill bushing 216 is inserted in the sleeve 214 and held in position by a screw 246. A drill bit, the same size as the hole 250 in the bushing 216, may then be used to accurately drill a bore in a desired position on a workpiece.

The supporting structure for the cross beam and sleeve assembly will need to be modified in an obvious manner to accommodate large workpieces. Furthermore, to accommodate different sets of drill bushings, it may be necessary to have sleeves of various internal diameters.

We have found that the cross beam and sleeve assembly comprising our drilling fixture may also be advantageously used with a simple box type of support structure not provided with a rotatable arbor. The cross beam can be similarly slidably mounted on any supported structure near a workpiece. A particularly useful embodiment is a box in which workpiece guides are mounted for positioning a workpiece. A cross beam and its sleeve assembly may then be similarly mounted to any face or faces of such a box.

Grinding method

Figure 15:
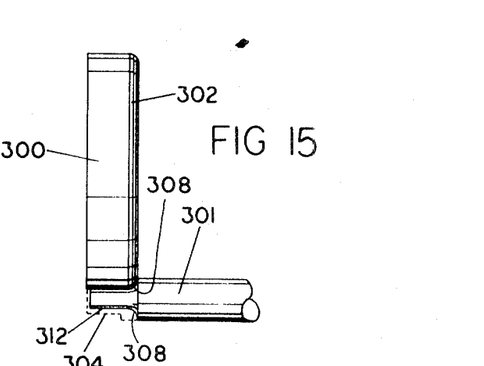
FIG. 15 is a view in side elevation of a dressed grinding wheel and a punch illustrating the grinding method of my invention.
Figure 16:
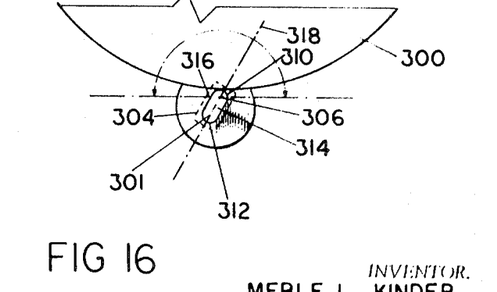
FIG. 16 is an enlarged view in front elevation of the grinding wheel and punch illustrated in FIG. 15.

FIGS. 15 and 16 illustrate our grinding method which, although it can most easily be performed using the embodiments of our invention, can also be performed using other wheel dressers and rotatable work holders. The purpose of our method is to grind an arcuate surface on a workpiece, such as the punch illustrated, in a manner which not only produces a maximum strength fillet between the punch and the stock forming its shank but also permits the fillet and the arcuate surface to be ground simultaneously to produce a fillet which more smoothly blends the punch to the shank.

The first step of our method is the dressing of the grinding wheel. Preferably, a desired surface is dressed into an initially squared wheel. For grinding the punch 301 illustrated in FIGS. 15 and 16, the wheel 300 is dressed with a quarter round surface 302 having a radius equal to the desired fillet radius. The wheel may be dressed in this manner by a conventional wheel dresser or by our basic unit illustrated in FIG. 1 with the dresser arm attachment illustrated in FIG. 3.

After the wheel is suitably dressed, a punch 301, which may first have been rough ground to the shape 304 illustrated in phantom, is clamped in a rotatable work holder. For example, it may be clamped in the V-block clamp illustrated in FIG. 4 which is mounted on the basic unit illustrated in FIG. 1. Since arcuate sides must be ground in each side of the punch 301, it will be mounted in the V-block and the V-block will be positioned on the radial bar 100 so that the proposed center 306 of one arcuate side lies on the axis of rotation of the basic unit. The punch 301 is then positioned perpendicularly below the wheel 300 with the dressed surface 302 positioned near the desired fillet 308. The basic unit is then reciprocated in the 180° arc illustrated in FIG. 16 while the grinding wheel is lowered. This reciprocation and lowering continues until an arcuate side 310 of the desired radius has been ground. This reciprocating rotary motion of the workpiece while in grinding contact with the dressed surface of the wheel serves to grind the fillet 308 and the arcuate side 310 simultaneously. One advantage of this is the smooth continuity of the fillet obtained which is superior to a separately adjusted and ground fillet.

The opposite arcuate surface 312 is then similarly ground. The flat sides 314 and 316 of the punch are ground by horizontally and linearly reciprocating these surfaces against the dressed grinding wheel with the punch's lateral axis 318 held horizontally.

The great advantage of our method becomes apparent after a brief consideration of the conventional method for grinding a similar punch. In the conventional method, a concave half round surface corresponding to the arcuate side 310 is first dressed into the grinding wheel. The punch is then positioned tangentially to this dressed surface (i.e. horizontally and at 90° to the position illustrated in FIG. 15). The arcuate surface 310 would then be ground by horizontally and linearly moving the punch along the wheel. However, because of the large diameter of the grinding wheel, the grind extends along a portion of the shank of the punch. Such a punch is joined to its shank by irregular contours which promote breakage and shorten the life of the punch.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

We claim:
1. A machining tool comprising:
 (a) a support frame;
 (b) a bearing attached to the frame;
 (c) an arbor journalled in the bearing and provided with an exterior angular surface which tapers only inwardly toward the bearing;
 (d) a collar surrounding the arbor at the angular surface the collar having a substantially radial threaded hole opposite said angular surface and having an end surface intermediate the angular surface and the bearing for thrusting toward the bearing;
 (e) a set screw threadedly engaged in the hole for adjustably seating against the angular surface substantially intermediate the boundary edges of said surface;
 (f) means fixed to the arbor for applying a rotational force to the arbor; and
 (g) a connector, fixed to a first end of the arbor, for connecting an attachment to the arbor for rotation therewith;
wherein tightening of the set screw against the angular surface causes longitudinal movement of the collar along the arbor toward the bearing for thrust adjustment of the machining tool.

2. A machine tool according to claim 1,
 wherein the angular surface is an annular, longitudinally tapered groove.

3. A machining tool according to claim 1, wherein
 (a) the arbor is provided with an annular longitudinally tapered groove, and
 (b) the bearing is intermediate the connector and the collar;
wherein tightening of the screw clamps the arbor longitudinally in the bearing to prevent non-rotational movement thereof.

4. A machining tool according to claim 3, wherein
 (a) the collar is provided with a plurality of radial, threaded, holes;
 (b) a radially adjustable screw is positioned in each hole for seating against the tapered groove and thereby causing longitudinal movement of the collar toward the connector; and
 (c) washers are positioned on the axle between the connector and the bearing and between the collar and the bearing.

5. A machining tool according to claim 3, wherein
 the connector comprises a body having a pair of perpendicularly intersecting slots having parallel sides, one of said slots having a planar bottom seating surface perpendicular to the axis of the arbor, and wherein
an attachment is provided, the attachment comprising:
  (a) a boss snugly seating within one of the slots; and
  (b) a cylindrical rod protruding from said boss snugly fitting within the other of said slots.

6. A machining tool comprising:
 (a) a support frame;
 (b) a bearing attached to the frame;
 (c) an arbor journalled in the bearing;
 (d) means fixed to the arbor for applying a rotational force to the arbor;
 (e) a connector, fixed at its proximal end to a first end of the arbor, for connecting an attachment to the arbor for rotation therewith, the connector having intersecting slots, each slot having parallel sides, one slot being substantially wider than the other and provided with a planar bottom seating surface perpendicular to the axis of the arbor to guide accurate positioning of attachments; and
 (f) a cooperating attachment comprising: a boss for snugly seating within one of the slots and against the planar seating surface, the boss having parallel sides spaced substantially the same distance apart as the parallel sides of the wider slot for snugly fitting therein, the boss also having a planar top for seating against said seating surface and thereby aligning said attachment; and a cylindrical rod protruding from said boss, snugly fitting within the other of said slots for accurate positioning and repositioning of the attachment, the rod extending from the boss, perpendicular to said parallel sides of the boss, and having a diameter substantially equal to the distance between the parallel sides of the narrower slot.

7. A machining tool according to claim 6, wherein one of the slots is radially aligned.

8. A machining tool comprising:
(a) a support frame;
(b) a bearing attached to the frame;
(c) an arbor journalled in the bearing;
(d) means fixed to the arbor for applying a rotational force to the arbor;
(e) a connector, fixed at its proximal end to a first end of the arbor, for connecting an attachment to the arbor for rotation therewith, the connector having intersecting slots each slot having parallel sides, one slot being radial and substantially wider than the other and provided with a planar bottom seating surface perpendicular to the axis of the arbor; and
(f) a cooperating V block clamp attachment comprising: a bar having parallel sides substantially the same distance apart as the parallel sides of the parallel-sided radial slot of said connector, the bar being snugly positioned in said parallel-sided slot; a saddle clamp fixed to a V block clamp, the saddle clamp provided with a pair of stirrup members forming a channel with parallel side walls, the bar being slidably positioned between the stirrup members, the parallel sides of the bar being substantially parallel to but of a width less than the parallel side walls of the saddle clamp; and adjustable clamping means for angularly and circumferentially adjusting and for rigidly positioning the saddle clamp on the bar.

9. A machining tool according to claim 8, wherein the clamping means comprises:
a plurality of set screws threadedly engaged through the walls of the channel.

10. A machining tool comprising:
(a) a support frame;
(b) a bearing attached to the frame;
(c) an arbor journalled in the bearing;
(d) means fixed to the arbor for applying a rotational force to the arbor;
(e) a connector, fixed at its proximal end to a first end of the arbor, for connecting an attachment to the arbor for rotation therewith, the connector having intersecting slots each slot having parallel sides, one slot being substantially wider than the other and provided with a planar bottom seating surface perpendicular to the axis of the arbor; and
(f) an adjustable arc-limiting accessory comprising: a base member rigidly mountable to said frame; a circular guide member fixed to the base member and extending along a path followed by a radius of the axis of rotation of the arbor, and having a correspondingly circular T groove; and a stop pin for limiting the arc of rotation of the arbor mounted to a carriage plate, the carriage plate being provided with an arcuate flange which slides along said circular T groove and is adjustably connected to a nut member which slides within the T groove for clamping the carriage plate to a selected position on the guide member.

11. A machining tool comprising:
(a) a support frame comprising a plate having a pair of parallel planar edges;
(b) a bearing attached to the frame;
(c) an arbor journalled in the bearing parallel to said planar edges of said plate;
(d) means fixed to the arbor for applying a rotational force to the arbor;
(e) a connector, fixed at its proximal end to a first end of the arbor, for connecting an attachment to the arbor for rotation therewith; and
(f) a cooperating, adjustable, arc-limiting accessory comprising: a base member rigidly mountable to said frame and comprising a saddle clamp having stirrup members with planar parallel faces engaging the planar faces of the support frame and having a set screw threadedly engaging the stirrup members and being adjustable into contact with said support frame for adjustably but rigidly attaching the arc limiting accessory to the support frame; a guide member fixed to the base member and extending along a path followed by a radius of the axis of rotation of the arbor; and a stop pin slidably attached to the guide member for limiting the arc of rotation of the arbor.

References Cited

UNITED STATES PATENTS

| | | | |
|---|---|---|---|
| 2,178,135 | 10/1939 | Brady | 125—11 |
| 3,376,674 | 4/1968 | Ernesto | 51—216 X |
| 2,595,093 | 4/1952 | Mour | 51—216 UX |
| 2,680,973 | 6/1954 | Toth | 51—220 UX |
| 3,006,331 | 10/1961 | Akert | 125—11 |

HAROLD D. WHITEHEAD, Primary Examiner

U.S. Cl. X.R.

51—217 R; 125—11 A